(12) United States Patent
Harke et al.

(10) Patent No.: US 12,352,943 B2
(45) Date of Patent: Jul. 8, 2025

(54) METHOD AND DEVICE FOR ILLUMINATING A SAMPLE IN A MICROSCOPE IN POINTS

(71) Applicant: ABBERIOR INSTRUMENTS GMBH, Goettingen (DE)

(72) Inventors: Benjamin Harke, Goettingen (DE); Lars Kastrup, Goettingen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 908 days.

(21) Appl. No.: 17/462,362

(22) Filed: Aug. 31, 2021

(65) Prior Publication Data

US 2022/0057615 A1 Feb. 24, 2022

Related U.S. Application Data

(63) Continuation-in-part of application No. 17/352,422, filed on Jun. 21, 2021, now abandoned, which is a
(Continued)

(51) Int. Cl.
*G02B 21/06* (2006.01)
*F21V 8/00* (2006.01)
(Continued)

(52) U.S. Cl.
CPC ............ *G02B 21/06* (2013.01); *G02B 6/0008* (2013.01); *G02B 21/025* (2013.01); *G02B 26/0833* (2013.01)

(58) Field of Classification Search
CPC .... G02B 21/06; G02B 6/0008; G02B 21/025; G02B 26/0833; G02B 6/04; G02B 21/082; G02B 21/16
(Continued)

(56) References Cited

U.S. PATENT DOCUMENTS 10,317,657 B2  6/2019  Kleppe et al.
11,372,223 B2  6/2022  Kleppe et al.
(Continued)

FOREIGN PATENT DOCUMENTS

DE  102013016367 A1  4/2015
EP     1617251 A1  1/2006
(Continued)

OTHER PUBLICATIONS

Kleppe et al. (WO 2017013033); High-Resolution Spectrally Selective Scanning Microscopy of a Sample (Year: 2017).*
(Continued)

*Primary Examiner* — Tuyen Tra
*Assistant Examiner* — Rahman Abdur
(74) *Attorney, Agent, or Firm* — WCF IP

(57) ABSTRACT

A method for punctiform illumination of a sample with a MINFLUX microscope has the sample being sequentially illuminated at illumination points of a predefined or predefinable illumination point pattern. The lateral extent of the illumination point pattern is smaller than the longest wavelength of the illumination light. The illumination points are always illuminated exclusively with a time offset. A distinct individual light source is assigned to each illumination point
(Continued)

Figure 1:
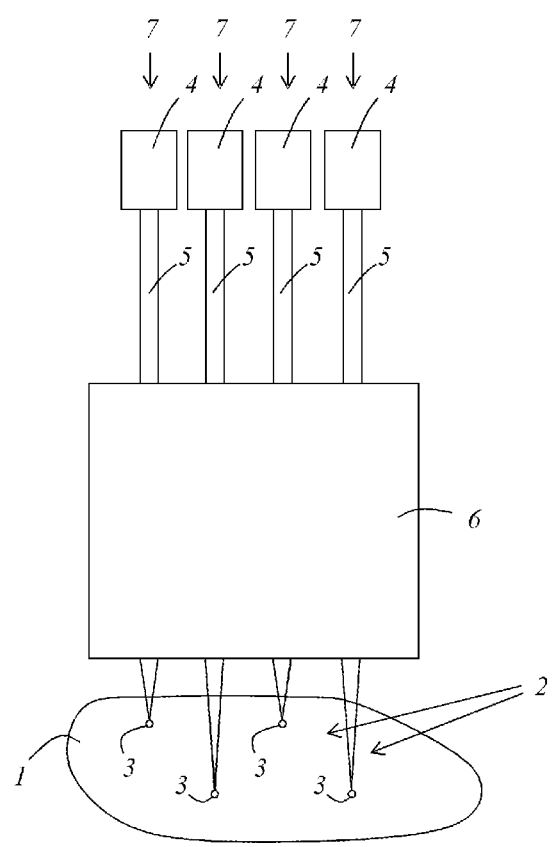

of the illumination point pattern. Each illumination point is illuminated by the focus of an illumination light bundle of the individual light source.

41 Claims, 11 Drawing Sheets

Related U.S. Application Data continuation of application No. PCT/EP2019/086988, filed on Dec. 23, 2019.

(51) Int. Cl.
*G02B 21/02* (2006.01)
*G02B 26/08* (2006.01)

(58) Field of Classification Search
USPC .......................................................... 359/385
See application file for complete search history.

(56) References Cited

U.S. PATENT DOCUMENTS

| | | | |
|---|---|---|---|
| 2006/0049343 | A1 | 3/2006 | Wolleschensky et al. |
| 2016/0124074 | A1* | 5/2016 | Wonneberger ........... G01C 3/32 356/4.01 |
| 2019/0137751 | A1* | 5/2019 | Kleppe ................ G02B 21/367 |

FOREIGN PATENT DOCUMENTS

| | | |
|---|---|---|
| WO | 2015022145 A1 | 2/2015 |
| WO | 2018069283 A1 | 4/2018 |

OTHER PUBLICATIONS

Hell et al. (WO 2017153430) Method for a high-resolution local imaging of a structure in a sample in order to detect reactions of an object of interest to altered environmental conditions (Year: 2017).*
"International Workshop on Single-Molecule Spectroscopy and Super-resolution in the Life Sciences", PicoQuant, 2019.
Adam, M et al., "Confocal multispot microscope for fast and deep imaging in semicleared tissues", Journal of Biomedical Optics vol. 23 No. 2, 2018.
Gwosch, K. et al., "MINFLUX nanoscopy delivers multicolor nanometer 3D-resolution in (living) cells", BioRxiv preprint, 2019.
Poher, V. et al., "Optical sectioning microscopes with no moving parts using a micro-stripe array light emitting diode", Optics Express vol. 15 No. 18, 2007.
C. J. R. Sheppard, "Super-Resolution in Confocal Imaging", Optic vol. 80 No. 2, 1988.
Pal, S. & Hazra, L., "Stabilization of pupils in a zoom lens with two independent movements", Applied Optics vol. 52 No. 23, 2013.
Balzarotti, F. et al., "Nanometer resolution imaging and tracking of fluorescent molecules with minimal photon fluxes", Science vol. 355, 2017.
Siwei Li et al., "Rapid 3D image scanning microscopy with multi-spot excitation and double-helix point spread function detection", Optics Express 26, No. 18, 2018.
Germann, J. & Davis, L., "Three-dimensional tracking of a single fluorescent nanoparticle using four-focus excitation in a confocal microscope", Optics Express vol. 22, No. 5, 2014.
Davis, L. et al., "Four-focus single-particle position determination in a confocal microscope", Conference Proceedings of SPIE, 2010.

* cited by examiner

METHOD AND DEVICE FOR ILLUMINATING A SAMPLE IN A MICROSCOPE IN POINTS

The invention relates to an apparatus and a method for punctiform illumination of a sample in a microscope, more particularly refers to a MINFLUX microscope, using focused illumination light, with the sample being sequentially illuminated at the illumination points of a predefined or predefinable illumination point pattern. The invention moreover relates to a method for examining a sample, in which the sample is illuminated using the aforementioned apparatus and method.

Namely, the invention relates to an apparatus for carrying out the method according to the invention and, in particular, an apparatus for punctiform illumination of a sample in a microscope, more particularly a MINFLUX microscope, wherein an illumination point pattern composed of a number of illumination points is predefinable, the sample is able to be illuminated in sequence at the illumination points in the sample. Moreover, the invention relates to a microscope comprising such an apparatus.

By way of example, MINFLUX microscopy is described in F. Balzarotti, Y. Eilers, K. C. Gwosch, A. H. Gynnā, V. Westphal, F. D. Stefani, J. Elf, S. W. Hell, "Nanometer resolution imaging and tracking of fluorescent molecules with minimal photon fluxes", Science 355, 606 (2017). By way of example the MINFLUX principle allows a fluorescence marker to be accurately located using a donut-shaped focus of a laser beam used to excite the fluorescence. For as long as the fluorescence marker is situated within the donut ring but not exactly at the zero thereof, it emits fluorescence photons which can be detected. If the donut-shaped focus is now placed at at least three illumination points of an illumination point pattern around the fluorescence marker, the position of the fluorescence marker can be determined by means of a kind of triangulation method. In an iterative process, the distance of the illumination points is reduced in relation to the position of the fluorescence marker as determined in the preceding location determination step. Namely, the focus can be moved in the range of some hundred nanometers relative to the fluorescence marker and the detected intensities can be evaluated in respect of the location of the fluorescence marker until the fluorescence marker has been localized with a desired or the maximum attainable accuracy or until the fluorescence marker has transitioned, either temporarily or permanently, from a fluorescing state to a non-fluorescing state, for example has been bleached.

The use of electro-optical scanners for fast positioning of the focus of an illumination light bundle is known in MINFLUX microscopy. However, the following disadvantages arise: Electro-optic scanners operate in a polarization direction-dependent and wavelength-dependent manner, thus fluorescence descanning is at best very complicated or even impossible. Moreover, fast switching of high voltages is disadvantageously required. Moreover, there is the disadvantage of a high power dissipation (=development of heat) in the case of non-resonant operation. Moreover, the components required are very expensive. A further disadvantage of electro-optic scanners is that the maximum attainable deflection angle is small.

There are comparable requirements to those of MINFLUX microscopy wherever the object is to obtain images by means of a combination of STED microscopy with the triangulation method known from MINFLUX microscopy or to obtain images by means of the so-called minfield-STED microscopy. In these methods, an excitation light for exciting the fluorescence is used in conjunction with, in general terms, a fluorescence inhibition light, specifically a light for generating stimulated fluorescence, i.e., a STED light, which suppresses the free fluorescence. Here, the fluorescence inhibition light is preferably focused in such a way that the focus has a central minimum while the excitation light can be focused as is conventional in e. g. confocal fluorescence microscopy. Both methods serve the localization of structures significantly below the diffraction limit and, moreover, with a resolution that is increased in comparison with STED microscopy. This may relate both to the localization of individual fluorescence markers and the capture of distributions of the concentration of fluorescence markers that are not able to be represented in individually resolved fashion. On account of the similarity in the requirements, devices known from the prior art also have comparable disadvantages.

In addition to the methods specified, further methods for imaging samples in which there is a sequential illumination of illumination points with spacings below the diffraction limit and which have a resolution better than the diffraction limit are also known, such as a method of confocal microscopy with the use of a pixelated detector, which is explained in the article "Superresolution in confocal imaging", Colin Sheppard, Optik 80, No. 2 (1988), pp. 53-54.

In view of the above, it is the object of the present invention to provide a method which allows fast sequential illumination of illumination points of an illumination point pattern and which is flexibly adjustable to the respective sample-specific and examination-specific requirements.

The object is achieved by a method of the type set forth at the outset, which is characterized in that a lateral extent of the illumination point pattern is smaller than the longest wavelength of the illumination light and in that the illumination points of the illumination point pattern are always illuminated exclusively with a time offset, i.e., there is no time at which two points of the illumination point pattern are illuminated simultaneously, and in that a distinct individual light source of a plurality thereof is assigned to each illumination point of the illumination point pattern and each illumination point is illuminated by the focus of an illumination light bundle of the individual light source assigned thereto.

It is a further object of the present invention to specify an apparatus, in particular for carrying out the method as described herein, which apparatus is flexibly adjustable to the respective sample-specific and examination-specific requirements and allows the illumination points of an illumination point pattern to be quickly illuminated in sequence. This object is achieved by an apparatus of the type set forth at the outset, which is characterized in that the lateral extent of the illumination pattern is smaller than the longest wavelength of the illumination light, more particularly smaller than half the longest wavelength of the illumination light, and in that a distinct individual light source of a plurality thereof is assigned to each illumination point of the illumination point pattern, wherein each of the individual light sources emits an illumination light bundle which is focused on the illumination point assigned thereto. Furthermore, in an embodiment a control apparatus controls the illumination process in such a way that the individual illumination points of the illumination point pattern are always exclusively illuminated with a time offset.

According to the invention, it was recognized that, for example, MINFLUX microscopy and single particle tracking require fast positioning of the focus of the illumination light in the sample which is not able to be realized sufficiently quickly using conventional scanners, in particular galvanometer mirrors, and so, initially, this lends itself to the use of resonantly operated scanners or electro-optic scanners. In principle, such fast positioning is also applicable to and very advantageous for further scanning microscopy methods, like those already mentioned above.

By way of example, in MINFLUX microscopy, in particular, fast and accurate positionability of an excitation light is important, while methods using a fluorescence inhibition light, in particular methods of STED microscopy, require fast and accurate positionability of the fluorescence inhibition light in particular. According to the invention, it is advantageously possible, for example, to continuously direct excitation light at a center of an illumination point pattern and only sequentially illuminate the illumination point pattern with the STED light. The light or the focused light bundle which requires the fast and accurate positionability is referred to as illumination light or illumination light bundle below. If reference is subsequently made of two points not being illuminated simultaneously, this statement always relates to the illumination light, which is the light whose fast positionability is decisive. However, this expressly does not preclude a plurality of illumination points being simultaneously illuminated by light whose fast positionability is unimportant. Certain methods require a sequential illumination with both excitation light and fluorescence inhibition light. In contrast to the illumination light, further light or further light bundles whose fast positionability is/are unimportant, is/are usually simply referred to as "light" or "light bundles".

As used herein, the term "bundle" or "light bundle" refers to light resulting from light beams of larger diameter or being a collimated bundle emitted parallel from a light source. The term bundle or light bundle include a light bundle emitted from a light point source. Unless otherwise indicated, the light bundle may be a bundle obtained from a primary source, e.g. in form of an illumination light bundle or a light bundle decoupled from single mode fiber as an illumination light point source.

Provision can advantageously be made, for example in view of MINFLUX microscopy, for the distance of an illumination point from each of its directly adjacent illumination points to be less than $\lambda/NA$, where $\lambda$ is the longest wavelength of the illumination light beam and NA is the numerical aperture of the imaging optical unit generating the focus. Within the scope of MINFLUX microscopy, this advantageously ensures that a fluorescence marker situated between two illumination points is respectively located in a focal region of an illumination light bundle both during the illumination of the one illumination point and during the time-offset illumination of the other illumination point. As long as the fluorescence marker is not situated in a minimum of the focus of an illumination light bundle, the fluorescence marker is impinged upon by illumination light and excited to fluoresce. If the foci have an intensity distribution with a central minimum, as is conventional in MINFLUX microscopy, for example, then a fluorescence marker may also be situated in the central minimum of the focus of one of the illumination light bundles and consequently not emit fluorescence light when the sample is impinged with this illumination light bundle; however, this precisely confirms that the fluorescence marker is situated in or at least very close to the intensity minimum of the intensity distribution for the relevant illumination point. At least, provision can advantageously be made for the distance of an illumination point from each of its immediately adjacent illumination points in a direction perpendicular to the propagation direction of the illumination light bundle illuminating it (lateral distance) to be less than $\lambda/NA$ or less than $\lambda/(2NA)$. In the case of three-dimensional illumination point patterns, provision can at least advantageously be made in this respect for the distances of directly adjacent projections of the illumination points onto a plane perpendicular to the optical axis and/or to the propagation direction of the illumination light to be less than $\lambda/NA$ or $\lambda/(2NA)$. If the method is carried out iteratively, the distances will be chosen to be slightly larger in the axial direction, at least during the first steps of the iteration, since the intensities around the zeros of generable intensity distributions with an axially restricted zero in the axial direction typically have a flatter increase than the intensities around the zeros of generable intensity distributions with a laterally restricted zero in the lateral direction.

A directly adjacent illumination point should in each case be understood to be the illumination point which is closest to the initial illumination point in one direction.

As used herein, the term "minimum", e. g. "intensity minimum" includes a minimum of zero, e. g. zero intensity. It is preferred that the minimum is as low as possible, ideally zero.

What generally applies, i.e., not only for MINFLUX microscopy, is that illumination points of an illumination point pattern being always illuminated with an illumination light exclusively with a time offset ensures that a fluorescence marker situated close to two illumination points is not simultaneously impinged by the illumination light of two individual illumination light sources.

The lateral extent of the illumination point pattern, i.e., the extent of a projection of the illumination point pattern into a plane perpendicular to the optical axis of the set of illumination light bundles in the sample, is smaller than the longest wavelength of the illumination light, preferably even smaller than half the wavelength of the illumination light.

The illumination light can have a single wavelength. In this case, this (single) wavelength is also the longest wavelength. Alternatively, it is also possible for an illumination light bundle to contain illumination light with a plurality of wavelengths. By way of example, it is possible to carry out multicolor STED examinations using illumination light containing a plurality of wavelengths.

In particular, as already mentioned above analogously in different words, provision can advantageously be made for the sample to be repeatedly illuminated in sequence at the illumination points of the predefined or predefinable illumination point pattern in order to obtain even more accurate localization results or in order to receive even more accurate information about the distribution of the concentration of fluorescence markers that cannot be represented with individual resolution. Here, in particular, provision can advantageously be made for a first localization iteration, in which illumination points of the illumination point pattern were each illuminated in time offset fashion by the focus of the illumination light of the illumination light bundle of the individual light source assigned thereto, to be followed by further localization iterations in an iteration process, said further localization iterations each being carried out with an illumination point pattern that has shorter distances between the illumination points than the respective immediately preceding illumination point pattern, wherein care is taken in each case (for example by a relative shift, in particular an automatic relative shift, between the sample and illumination light) for the fluorescence marker to always be situated within the currently used illumination point pattern. In this case, to increase the localization accuracy, it is advantageous in MINFLUX microscopy to increase the strength of the illumination when the distances between the illumination points of the illumination point pattern are reduced. A corresponding statement can apply to the use of a combination of excitation light and fluorescence prevention light, in particular for the strength of the fluorescence prevention light, which is the illumination light whose fast positionability is important in this case, wherein in this case, depending on method and/or depending on the type of sample examined, a localization accuracy is increased even more or even more accurate information is obtained by the distribution of the concentration of fluorescence markers that cannot be presented in individually resolved fashion. In this way, there is an increase in the accuracy of the localization or, in general, the quality of information about the sample each subsequent iteration.

According to the present invention, it was further recognized that the use of three-dimensional illumination point patterns is advantageous for many types of sample examination, wherein, however, fast positioning of the focus of the illumination light in three spatial directions is not realizable or only realizable with very high efforts, even with resonantly operated scanners or electro-optic scanners. According to one possible embodiment of the present invention, the illumination of the illumination points of a three-dimensional illumination point pattern can be realized, for example, by using an optical fiber bundle, in which some of the decoupling ends of the optical fibers, which act as individual light sources, are axially spaced apart from one another; this is explained in detail below.

The present invention has the very special advantage that no complicated, fast scanner, in particular no resonantly operated scanner or electro-optic scanner, is required.

The invention is moreover advantageous in that the illumination points are illuminated without spatial variations by the focus of the illumination light of the illumination light bundle of the individual light source assigned thereto. What is advantageously exploited here is that there is no need for a mechanical or electro-optic beam deflection device, which steers an illumination light beam from illumination point to illumination point. This is because such beam deflection devices may be disadvantageous in that the reproducibility of the respective individual settings to be undertaken is limited. In particular, it is possible to image the illumination light bundles forming the illumination point pattern in the in the focal plane of the sample and the Fourier plane based on the angle of incidence α of each of the illumination light bundles, e. g. emerging from the optical fibers.

Moreover, the present invention advantageously facilitates the use of largely any desired illumination point pattern, in particular also three-dimensional illumination point patterns. Moreover, the present invention is very particularly advantageous in that different intensity distributions (e.g., ring focus or bottle focus) are possible for different illumination points of the illumination point pattern.

According to the invention, provision can advantageously be made for repeated scanning of a small number (e.g., <10) of illumination points in the sample, with the location of the illumination points remaining constant or being able to be adjusted within the scope of the repetitions.

In an advantageous embodiment, the illumination point pattern is chosen in such a way that at least three of the illumination points of the illumination point pattern lie along a straight line or that all illumination points of the illumination point pattern lie along a straight line. Such an illumination point pattern is particularly advantageous if the task is to ascertain at least one spacing of fluorescence marker molecules and/or of structures of the sample of interest from the spatial data of a plurality of fluorescence marker molecules.

In an advantageous embodiment, the illumination point pattern is chosen in such a way that the illumination points of the illumination point pattern lie in a common plane. This plane is preferably arranged perpendicular to the optical axis. However, it is also possible for the plane to have an angle with respect to the optical axis that differs from 90 degrees. In particular, the two-dimensional illumination point pattern can be a Cartesian or a hexagonal illumination point pattern. In particular, it is also possible for illumination points to be located at the corners and optionally in the center of a triangle or quadrilateral.

In a very particularly advantageous embodiment, the illumination points of the illumination point pattern do not all lie in a common plane. By means of a three-dimensional illumination point pattern it is also possible, in particular, to examine complicated structures within a sample. By way of example, an advantageous three-dimensional illumination point pattern can be embodied as a cubic illumination point pattern or as a body-centered cubic illumination point pattern or as a face-centered cubic illumination point pattern. In particular, provision can alternatively or additionally advantageously be made for the illumination points of the illumination point pattern to be arranged at the corners of a geometric structure, for example of a tetrahedron, a cube or an octahedron. In particular, at least one illumination point of the illumination point pattern can be arranged within the geometric structure. In particular, an illumination point can be arranged at the center of the geometric structure. In particular, the illumination point pattern can have its illumination points at the corners of a Platonic solid. In particular, the illumination point pattern can have a regular geometric structure. However, it is also possible for the illumination point pattern not to have a regular structure and, in particular, not to have illumination points at the corners of a Platonic solid. Irregular illumination point patterns in particular are well suited to a particularly fast localization of a fluorescence marker. In particular, an illumination point can additionally be present at the center.

An illumination point pattern in which the illumination points all have the same distance from a center is particularly advantageous. If in each case the same fluorescence light power is measured in the case of such an illumination point pattern as a reaction to the illumination of each of the illumination points and if symmetric intensity distributions are present in focuses that are identical to one another, it is possible to deduce that the fluorescence marker is situated exactly in the center of the illumination point pattern. To check, the illumination point pattern can additionally have an illumination point at the center. If use is made of a focus of excitation light with a central intensity minimum, no fluorescence light is then emitted when the central illumination point is impinged because the fluorescence marker is situated exactly in the intensity minimum.

As noted before, in an aspect of the present invention, the apparatus and method according to the present invention are based on single illumination light bundles formed from the primary light source, e. g. emerging from optical fibres, which are typically present as optical fibre bundles. By optical means, e. g. with an imaging optical unit, each of the illumination light bundles which form the illumination point pattern in the sample to be analysed are e. g. collimated with a collimator, thus, are deflected in such a way that they intersect in a plane, the Fourier plane, conjugated to the focal plane in the sample. In case of three dimensional pattern, the illumination light points of said pattern are not in a single plane but differ to form the 3D pattern. Thus, collimation is not exactly in the Fourier plane but may be divergent or convergent relative thereto. Alternatively, this effect may be achieved by uniting beams or bundles being different in their divergence or convergence in the Fourier plane accordingly.

The apparatus may include a micromirror array and a microlens array, each lens being coordinated with one single mirror or a certain contiguous group of micromirrors, each lens forming a single illumination light focus acting as an as a illumination light point source, so that each of the illumination light bundles which form the illumination point pattern in the sample to be analysed virtually emanates out of such a single illumination light focus. In this case the micromirror array acts as a variable decoupler, which pass sequentially the light to the different microlenses.

In particular, in case of three-dimensional illumination point patterns, the microlenses of the microlens array may have different focal lengths, so that they create a three-dimensional pattern of illumination light foci, Very generally, provision can advantageously be made for the illumination points to be additionally illuminated by further light. In particular, provision can advantageously be made for the illumination points to each be additionally illuminated by the focus of a further light bundle. By way of example, the further light of the further light bundle can have a different wavelength to the illumination light. As an alternative or in addition thereto, it is also possible for the focus of the further light bundle to have a different shape to the focus of the illumination light bundle.

Particularly if the task is to examine a sample with particularly high resolution, the illumination light can be fluorescence inhibition light and the further light can be excitation light. Here, provision can advantageously be made for each illumination point to be impinged by the focus of a light bundle and the focus of a fluorescence inhibition light bundle as illumination light bundle. Particularly in the case of such an embodiment it is advantageous if the focus of the further light bundle has an intensity distribution that is complementary to the focus of the illumination light bundle and/or if the focus of the further light bundle has an intensity maximum where the focus of the illumination light bundle has an intensity minimum. In the case of such a superposition, the two light bundles can form an illumination light bundle together.

To shape the focus, a phase-modulating device, referred to as a phase modulator for short below, can be arranged in the respective bundle path of the illumination light bundle and/or of the further light bundle. In an advantageous embodiment, the phase modulator is arranged in the common beam path of the illumination light bundles and/or the further light bundles. In particular, the phase modulator can advantageously be embodied in such a way that the intensity distribution in the foci of the further light bundles is not influenced by the phase modulator while the phase modulator influences the intensity distribution in the foci of the illumination light bundles in such a way that the latter is complementary to the intensity distribution in the foci of the illumination light bundles, in particular such that it has a local minimum at the center, while the intensity distribution in the foci of the further light beams has a maximum at the center.

In a very particularly advantageous embodiment, each illumination point is impinged by excitation light and fluorescence prevention light. In particular, provision can advantageously be made for each illumination point to be illuminated by a focus of an illumination light bundle containing fluorescence excitation light and fluorescence inhibition light, with the focus containing two components, specifically that of the fluorescence inhibition light and that of the excitation light, wherein the focus of the fluorescence inhibition light has an intensity maximum which spatially surrounds an intensity maximum of the excitation light bundle. Fluorescence marker molecules situated in the periphery of the focus of the illumination light bundle containing fluorescence excitation light are thus prevented from emitting fluorescence light, and so the sample is impinged by an effective PSF (point spread function) which has significantly reduced dimensions in relation to the confocal PSF. By scanning the sample with this smaller PSF, a localization accuracy, for example, is significantly increased in the case of the same number of spontaneously emitted photons.

In view of an option for configuring the apparatus according to the invention, provision can advantageously be made for the illumination intensity of the illumination light beams and/or the intensity distribution in the focus of the illumination light bundles and/or of the further light bundles to be adjustable individually or together. Likewise, provision can be made for intensities of the excitation light bundles and fluorescence inhibition light bundles, which together form an illumination light, to be adjustable individually or together. Particularly for this purpose, a distinct light intensity modulator can be arranged in the beam path of each excitation light bundle and/or further fluorescence inhibition light bundle. The light intensity modulators can each be embodied as, for example, liquid crystal SLMs or as micromirror arrays or can be embodied as acousto-optic light intensity modulators or as electro-optic light intensity modulators or as liquid crystal modulators.

Very generally, provision can advantageously be made for the illumination points to be respectively illuminated simultaneously or with a time offset, which also includes a time overlap, by the components of a light forming an illumination light together.

In one possible embodiment, all components of the illumination light are emitted by the individual light sources. In this case, provision can in particular be made for one or more primary light sources to be embodied as multicolor lasers.

In a particular embodiment, the illumination light bundles and/or the further light bundles are guided to the assigned illumination points via light paths which have optical path lengths of different length; likewise, the light components which form an illumination light together can be guided to the assigned illumination points via light paths which have optical path lengths of different length. If the illumination light bundles are guided to the assigned illumination points by light paths which have optical path lengths of different length, the sequential illumination of the illumination points is achieved by virtue of the light pulses of different individual light sources requiring different periods of time to arrive at the respectively assigned illumination point. Here, the optical path lengths can also be adjustable together or individually, for example using adjustable optical retardation paths. For example the difference in the optical path lengths causes a temporal retardation of successive illumination light pulses of different illumination light bundles of about 3 ns.

In a particular embodiment a pulsed laser, which can have a pulse frequence of for example $f_{p1}$=20 MHz or $f_{p2}$=40 MHz, is used as primary light source, the light emanating from the laser is split in a number of light bundles equal to the number of illumination light points. The temporal retardation between successive illumination light pulses of different illumination light bundles preferably is adapted to the time interval between successive primary pulses of the laser, which is for example $t_{d1}=50$ ns or $t_{d2}=25$ ns, and to the number of illumination points. Preferably the time delay between successive illumination light pulses of different illumination light bundles equals the time interval between successive primary pulses of the laser divided by the number of illumination points.

In particular, it is also possible for the individual light sources to be formed by spatially splitting the light of a primary light source into the illumination light bundles, the spatial splitting being able to be realized by coupling different light components of the light of the primary light source into the optical fibers of an optical fiber bundle. To this end, the input end of the optical fiber bundle can be, for example, illuminated over a large area by the light of the primary light source such that, ultimately, the decoupling ends of the optical fibers act as the individual light sources. Alternatively, provision can be made in view of a particularly good input coupling efficiency for different light components of the light of a primary light source to be focused into the individual optical fibers of an optical fiber bundle in targeted fashion, particularly if single mode optical fibers are used. By way of example, a microlens array adapted to the spatial conditions of the optical fiber bundle can advantageously be used to this end. By way of example, it is also possible to couple each light component into a respective optical fiber using a separate optical unit. It is likewise possible to couple light of a plurality of primary light sources, in particular a plurality of primary light sources with different wavelengths, into the optical fibers of an optical fiber bundle together such that an illumination light having different components such as an excitation light and a fluorescence prevention light is formed.

The optical fibers can be embodied to have different lengths such that the individual light pulses of the illumination light beams emerge successively in time from the decoupling ends of the different optical fibers of the optical fiber bundle. This facilitates a sequential and repeated illumination of the illumination points of an illumination point pattern.

In particular, the optical fibers can be embodied as single mode fibers and/or as polarization-maintaining fibers.

Preferably, the apparatus is embodied in such a way that the illumination duration at the illumination points of the illumination point pattern is adjustable. By way of example, the illumination duration can be altered by virtue of an output pulse duration of a primary light source being altered or by virtue of an optical medium with a group velocity dispersion that differs from zero being introduced or removed from the beam path. In particular, provision can advantageously be made for the illumination duration at the illumination points of the illumination point pattern to be adjustable individually from illumination point to illumination point.

In particular, provision can advantageously be made for the illumination duration at each of the illumination points of the illumination point pattern to be no more than 50 µs, in particular no more than 10 µs, very particularly no more than 5 µs in each case.

In an advantageous embodiment, provision is made for the illumination intensity and/or the intensity distribution within the focus to be respectively the same at all illumination points within an illumination sequence. Alternatively, it is also possible for the illumination intensity and/or the intensity distribution within the focus to be respectively different at all illumination points within an illumination sequence.

In a particularly advantageous embodiment, the illumination intensity and/or the intensity distribution within the focus are altered at the illumination points on the basis of the already implemented number of repetitions of the sequential illumination of the illumination points.

Very generally, provision can advantageously be made for the illumination light of each individual light source to be set on an individual basis in respect of a luminous power and/or a pulse duration of a wavelength and/or a shape of the focus at the location of the assigned illumination point.

It is possible that each individual light source is respectively formed by a primary light source, which emits one of the illumination light bundles, in particular formed by a laser or semiconductor laser. In particular, provision can advantageously be made for the individual light sources to each be activated and deactivated in a predefined or predefinable sequence in order to illuminate the illumination points sequentially in each case.

Alternatively, it is also possible for the individual light sources to each be activated and deactivated in a random order in order to illuminate the illumination points sequentially in each case.

As already mentioned, it is alternatively also possible for the individual light sources to be formed by spatially splitting of the light of a primary light source into the illumination light beams. Here, provision can advantageously be made for, in particular, the primary light source to emit pulsed light.

As likewise already mentioned, the spatial split can be implemented by virtue of, for example, different light components of the light of the primary light source being coupled into different optical fibers. The entry end of the optical fiber bundle, for example, can be illuminated over a large area with the light of the primary light source to this end. Alternatively, different light components of the light of a primary light source can be focused into the individual optical fibers of an optical fiber bundle in a targeted fashion, particularly if use is made of single mode optical fibers. By way of example, a microlens array adapted to the spatial conditions of the optical fiber bundle can advantageously be used to this end. By way of example, it is also possible to couple each light component into a respective optical fiber using a separate optical unit.

In an embodiment, the apparatus according to the present invention comprises an imaging unit. Said imaging unit is able to image the illumination light bundles in form of a predefined illumination point pattern, whereby this predefined illumination point pattern consisting of point light sources as decoupling ends of optical fibers or foci generated by microlenses of a microlens array, is, apart from the magnification, identical with the illumination point pattern in the focal plane in the sample, thus, the predefined illumination point pattern represents each of the illumination points in the identical pattern accordingly. In case of a three-dimensional illumination point pattern, the magnification in a direction of the optical axis can be slightly different from the magnification in lateral direction.

For the purposes of illuminating the illumination points, the decoupling ends of the optical fibers can be imaged into the illumination points by means of the imaging optical unit, which can contain a microscope objective, in particular. As already mentioned, the optical fibers can have embodiments of different length in order to attain a sequential illumination. A collimator in the beam path collimates the individual illumination light bundles into the Fourier plane with the desired angle and divergence respective convergence, eventually imaging said illumination point pattern in the sample.

In a very particularly advantageous embodiment, the decoupling ends of at least two optical fibers, in particular of all optical fibers, are arranged in different optical planes. This embodiment has the particular advantage that the decoupling ends of the optical fibers, which act as individual light sources, are focused into different sample planes in relation to the light propagation direction (z-direction) by the imaging optical unit. In this way, it is possible to realize a three-dimensional illumination point pattern.

In another embodiment, spatial splitting is implemented by illuminating a plurality of mirrors of a micromirror array with the light of a primary light source. The primary light source can emit continuous, i.e. non-pulsed light. By means of the micromirror array, it is possible to reflect different light components in different spatial directions in order to form the illumination light bundles of the individual light sources. In particular, use can be made of a digital micromirror device (DMD). A digital micromirror device can be embodied in such a way that the possible positions of the individual mirrors are precisely defined by stops. Particularly in this case, the use of a digital micromirror device facilitates a very precise beam control.

In the micromirror array imaging the illumination light bundles into the sample, each micromirror may be controlled individually or separately. In another embodiment, a group of mirrors may be controlled, for reflecting the illumination light bundles accordingly.

In an embodiment, the reflected illumination light bundles are passed through microlenses, like a microlens array, whereby the microlenses may have identical or different focal length. As described herein, each illumination light bundle is assigned to an illumination light point accordingly. Namely, the microlenses e. g. in form of the microlens array focus the illumination light into a point pattern, which acts as a point source pattern, which means, each focus has the same function as a decoupling end of a fiber in the embodiment described above in which the decoupling ends of the optical fibers can be imaged into the illumination points by means of the imaging optical unit. A collimator in the beam path collimates the individual illumination light bundles into the Fourier plane with the desired angle and divergence respective convergence, eventually imaging said illumination point pattern in the sample.

In a particularly advantageous embodiment, a beam deflection apparatus that is adjustable in respect of the deflection angle is present; it can be used to position the entire illumination point pattern relative to the sample before and/or during the illumination process. By way of example, the adjustable beam deflection apparatus can comprise a galvanometer mirror.

As already mentioned, an imaging optical unit can advantageously be present, the latter imaging the illumination light bundles and/or the further light bundles into the illumination points. In particular, an imaging optical unit can be present, the latter imaging the decoupling ends of optical fibers into the illumination points.

In an advantageous embodiment the imaging optical unit comprises a phase modulator. The phase modulator can serve to shape a focus of the illumination light bundles or of the further light beams.

As an alternative or in addition thereto, provision can advantageously be made for the imaging optical unit to contain a device, by means of which the spacing of the illumination points of an illumination point pattern can be set with respect to one another. This is advantageous both in view of carrying out an iterative MINFLUX method, in which the illumination points can iteratively approach a center and in view of, e.g., the so-called minfield-STED method. By way of example, the imaging optical unit can comprise a lens with an adjustable focal length and/or a deformable mirror and/or an SLM to this end.

In an advantageous embodiment, the imaging optical unit comprises a zoom optical unit, by means of which the imaging scale of the imaging optical unit is able to be altered such that the zoom optical unit can be used to set the distance between the illumination points. The zoom optical unit can advantageously be embodied in such a way that the relative position of the pupil planes always remains the same, independently of the magnification factor. Such a zoom optical unit is described in EP 1 617 251 A1, for example. By way of example, it may be constructed from four lens groups that are displaceable relative to one another. Further zoom optical units with only three lenses, which have relative positions of the entry and exit pupil that are identical for at least a plurality of different magnifications, are described in a publication by Sourav Pal and Lakshminarayan Hazra: "Stabilization of pupils in a zoom lens with two independent movements", Appl. Opt. 52, 5611-5618 (2013).

Very generally, provision can advantageously be made for the imaging optical unit to focus at least two illumination light bundles and/or further light bundles into different optical planes within the sample. As already mentioned above, this can be realized by virtue of, for example, the decoupling ends of optical fibers, which act as individual light sources, being arranged in spaced apart optical planes (i.e., planes spaced apart from one another in the z-direction). Alternatively, this may be arranged by using microlenses having different focal length.

According to a particularly advantageous concept of the invention, use is made of a plurality of point detectors, with different illumination points of the illumination point pattern each being assigned a point detector which detects the detection light, more particularly fluorescence light, emanating from the respective illumination point. In this context, provision can particularly advantageously be made for each point detector to be formed by a detection optical fiber and a downstream individual detector such that different illumination points of the illumination point pattern each are assigned a distinct detection optical fiber and for the detection light emanating from the respective illumination point to be coupled into the detection optical fiber assigned thereto.

A microscope, more particularly a MINFLUX microscope, which serves to examine a sample and which comprises an apparatus according to the invention for sequential illumination of a sample at different illumination points of an illumination point pattern is particularly advantageous. Here, provision can advantageously be made for each illumination point to be assigned a respective point detector which detects the detection light, more particularly fluorescence light, emanating from the respective illumination point.

In particular, as already mentioned above, provision can advantageously be made for each point detector of the microscope to be formed by a detection optical fiber and a downstream individual detector. In this way, different illumination points of the illumination point pattern each are assigned a detection optical fiber, wherein the detection light emanating from the respective illumination point is coupled into the detection optical fiber assigned thereto and thus supplied to the assigned individual detector. The detection optical fibers can advantageously be combined to form a detection optical fiber bundle.

Very generally, provision can advantageously be made for the detection light to be detected in time-resolved fashion such that each instance of detection light can be assigned to a respective illumination light pulse.

A method for localizing fluorescence marker molecules in a sample, in which the sample is illuminated as per the method according to the invention, with the amount of fluorescence light emanating from the illuminated sample regions being measured in each case, is very particularly advantageous. In particular, provision can advantageously additionally be made for the distance of each fluorescence marker molecule from a respective illumination point to be ascertained taking account of the intensity distribution of the illumination light bundle illuminating the respective illumination point and the respectively measured amount of fluorescence light. What is exploited here is that a fluorescence marker which has emitted a certain amount of fluorescence light in reaction to illumination by illumination light can only be situated at one of the points within the intensity distribution (assumed to be known) at which the illumination intensity corresponds to the measured amount of fluorescence light.

A known intensity distribution in the foci is preferably also taken into account when determining the accurate position of the fluorescence marker molecule within the illumination point pattern.

Figure 2:
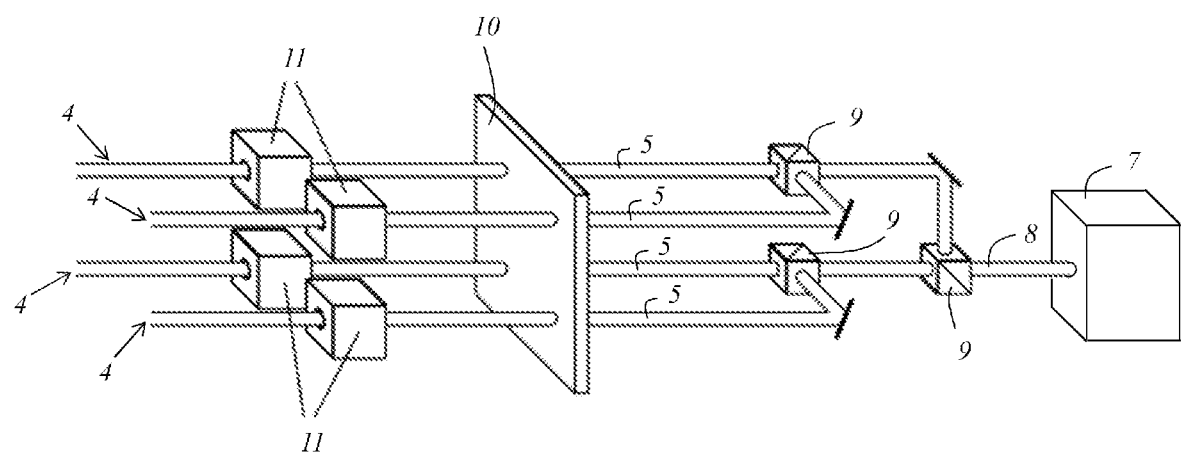
Figure 3:
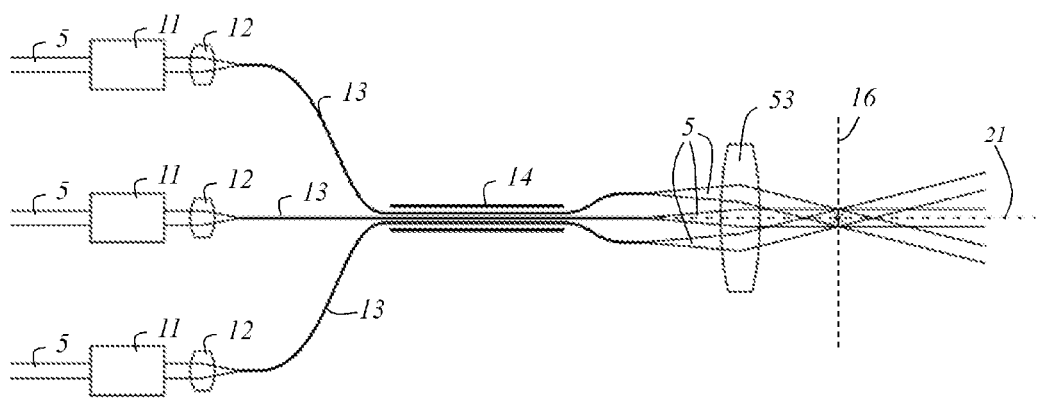
Figure 4:
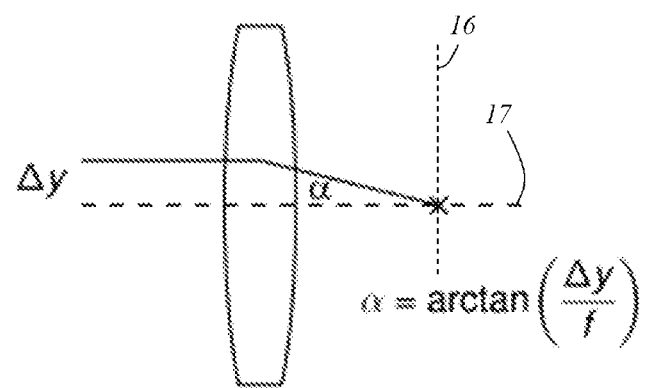
Figure 5:
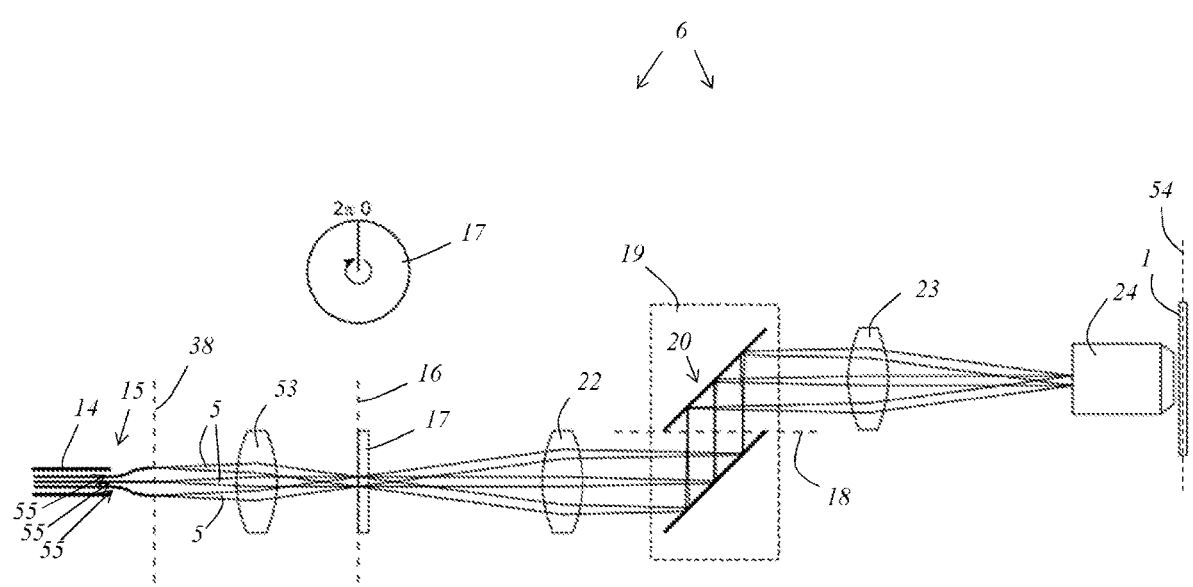
Figure 6:
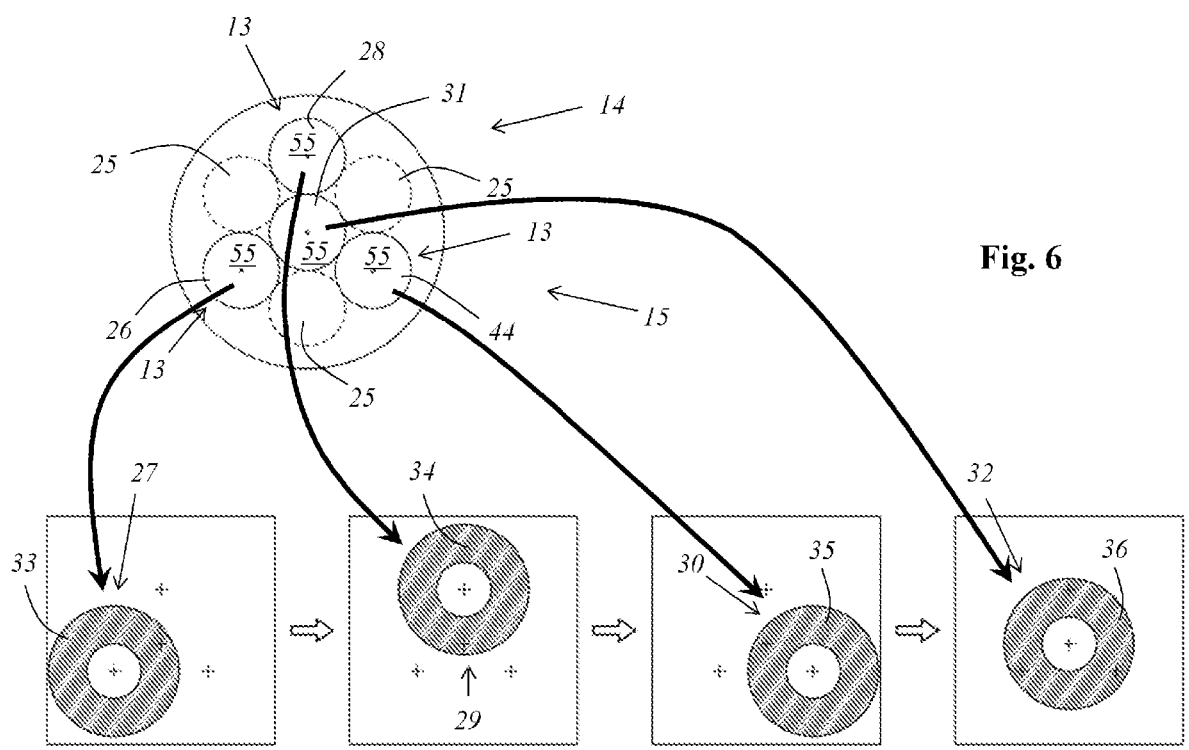
Figure 7:
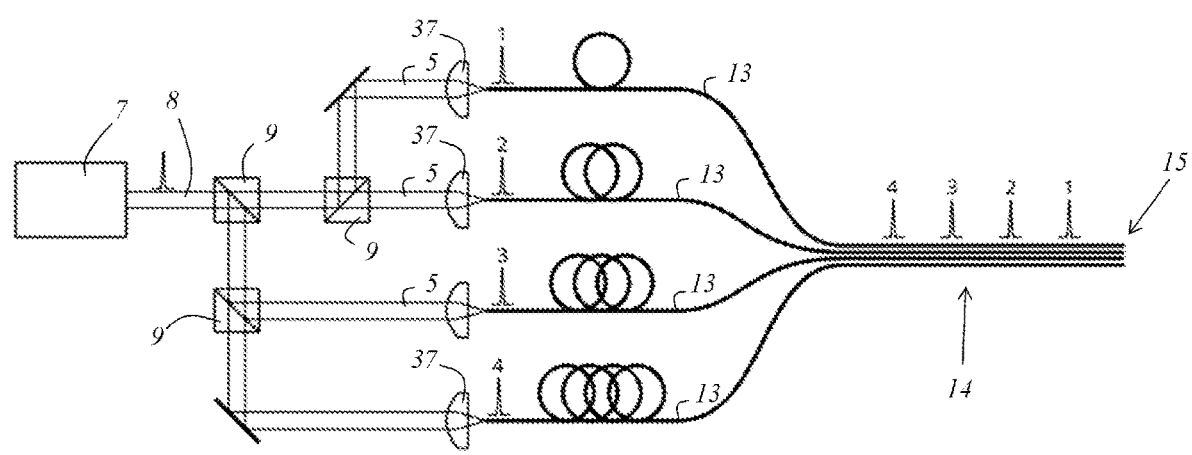
Figure 8:
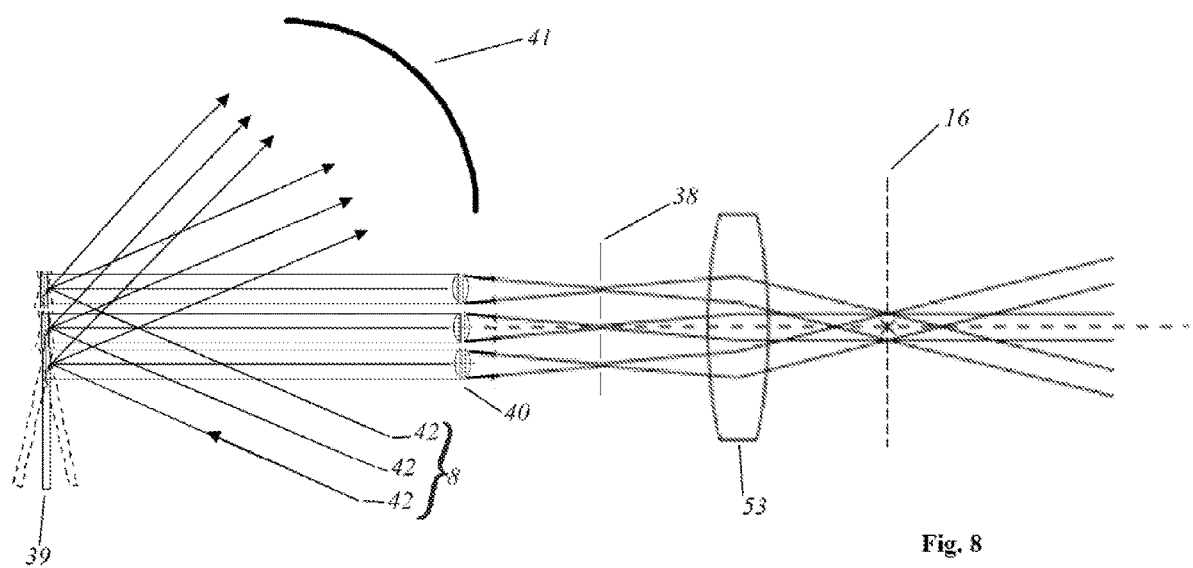
Figure 9:
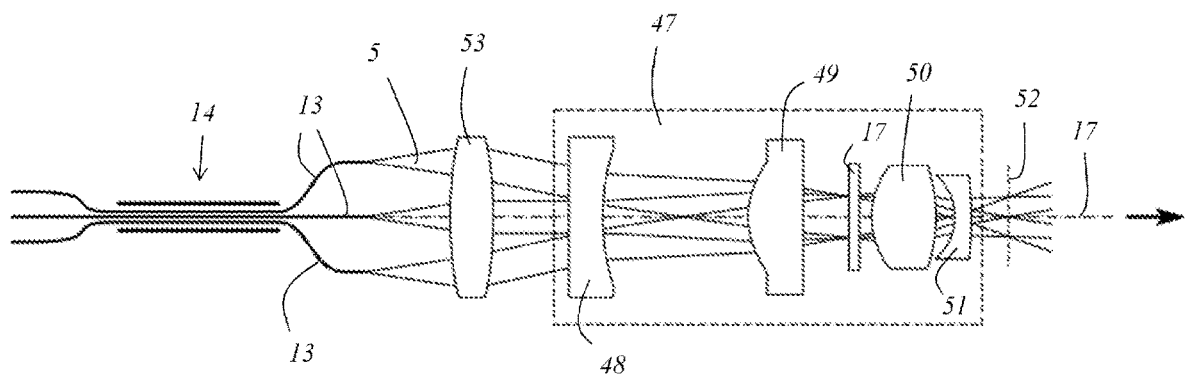
Figure 10:
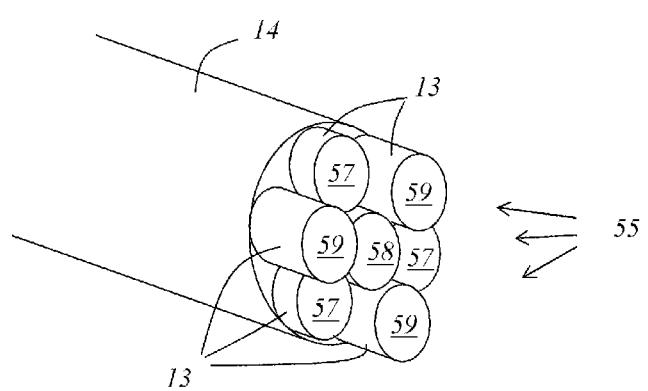
Figure 11:
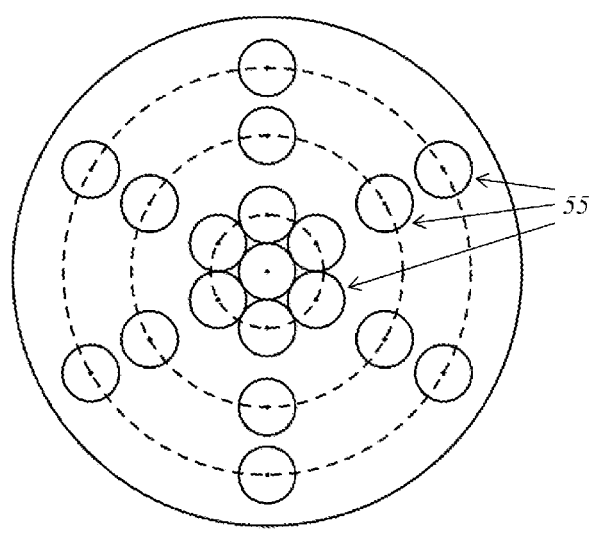

The subject matter of the invention is illustrated in an exemplary and schematic manner in the drawing and will be described hereunder by means of the figures, wherein identical elements or elements of equivalent function are in most instances provided with the same reference signs even in different exemplary embodiments. In detail:

FIG. 1 shows a first exemplary embodiment of an apparatus according to the invention for punctiform illumination of a sample, FIG. 2 shows a detailed view of a second exemplary embodiment of an apparatus according to the invention for punctiform illumination of a sample, FIGS. 3 and 4 show detailed views of a third exemplary embodiment of an apparatus according to the invention for punctiform illumination of a sample, FIG. 5 shows a detailed view of a fourth exemplary embodiment of an apparatus according to the invention for punctiform illumination of a sample, FIG. 6 shows an exemplary embodiment in relation to a possible arrangement of the optical fibers 13 within an optical fiber bundle 14, FIG. 7 shows a detailed illustration of a fifth exemplary embodiment of an apparatus according to the invention for punctiform illumination of a sample, FIG. 8 shows a detailed view of an exemplary embodiment of an apparatus according to the present invention detailing the beam pattern of the illumination light bundles further according to the invention which contains an apparatus according to the invention for punctiform illumination of a sample, FIG. 9 shows a detailed view of a exemplary embodiment of an apparatus according to the invention for punctiform illumination of a sample, FIG. 10 shows a detailed view of a further exemplary embodiment of an apparatus according to the invention for punctiform illumination of a sample, and FIG. 11 shows a detailed view of another exemplary embodiment of an apparatus for punctiform illumination of a sample.

FIG. 1 schematically shows a first exemplary embodiment of an apparatus according to the invention for punctiform illumination of a sample 1 in a microscope, more particularly a MINFLUX microscope, wherein an illumination point pattern 2 is able to be defined, at the illumination points 3 of which the sample 1 is able to be repeatedly illuminated in sequence. A distinct individual light source 4 of a plurality thereof is assigned to each illumination point 3 of the illumination point pattern 2, with each of the individual light sources 4 emitting an illumination light bundle 5 which is focused on the illumination point 3, which is assigned thereto, by means of an imaging optical unit 6 which, in particular, may contain a microscope objective 24 (not illustrated in this figure).

Each of the individual light sources 4 is formed as a primary light source 7, which may be embodied as a laser, for example.

FIG. 2 shows a detailed view of a second exemplary embodiment of an apparatus according to the invention for punctiform illumination of a sample 1. In the second exemplary embodiment, the individual light sources 4 are formed by spatially splitting the light 8 from a single primary light source 7. Beam splitters 9 connected in succession in cascaded form, which may be embodied as neutral density or polarization beam splitters, in particular, serve to split the light 8 of the primary light source 7. It is also possible for the beam splitters 9 to be embodied as dichroic beam splitters in order to impinge different illumination points 3 with illumination light of different wavelengths.

An SLM (spatial light modulator) 10 is arranged in the beam path of each of the illumination light bundles 5 as a constituent part of an imaging optical unit 6 (otherwise not illustrated in any more detail) which images the illumination light bundles 5 into the illumination points 3. By way of example, the SLM 10 can serve to realize a certain shape of the focus of the illumination light bundles 5 at the location of the illumination points 3.

Moreover, a light intensity modulator 11 is situated in the beam path of each of the illumination light bundles 5. By means of the light intensity modulators 11, it is possible to set and/or temporally modulate the luminous power of each individual illumination light bundle 5. By way of example, it is possible to repeatedly activate and deactivate the individual light sources 4 in a predefined or predefinable sequence by means of the light intensity modulators 11 in order to sequentially (temporally successively) illuminate the illumination points 3. By way of example, it is also possible that the individual light sources 4 are respectively activated and deactivated in a random sequence by way of a corresponding control of the light intensity modulators 11 in order to illuminate the illumination points 3 sequentially in random fashion.

Alternatively, it is also possible for the single primary light source 7 to be embodied as a pulsed light source, for example as a pulsed laser, such that the luminous power of the pulsed illumination light bundles 5 of each of the individual light sources 4 can be set on an individual basis with the aid of the light intensity modulators 11. In such an embodiment, the optical path lengths of the individual illumination light bundles 5 are preferably different such that the illumination light pulses of the individual illumination light bundles 5 take different lengths of time to arrive at the associated illumination points and the illumination of the illumination points 3 by the illumination light pulses is consequently implemented in sequence. Preferably, the apparatus is embodied in such a way that the optical path lengths of the individual illumination light bundles 5 are adjustable together or individually. By way of example, adjustable optical retardation paths may be present to this end.

FIG. 3 shows a detailed view of a third exemplary embodiment of an apparatus according to the invention. In this exemplary embodiment, the illumination light beams 5 are each coupled into an optical fiber 13 by means of an input coupling optical unit 12 after they have respectively passed a light intensity modulator 11. The optical fibers 13 are combined to form a fiber bundle 14. The illumination light bundles 5 emerging from the optical fibers 13 of the optical fiber bundle 14 are collimated by means of a collimator 53 and deflected in such a way that they intersect in a plane, the Fourier plane 16, with respect to the focal plane (not illustrated) in which the illumination points are arranged. By way of example, it is advantageously possible to arrange a phase modulator 17 in this Fourier plane 16 in order, for example, to influence the shape of the focus of each of the illumination light bundles 5 at the location of the illumination points 3.

FIG. 4 illustrates how a distance Δy from the optical axis 21 is converted into an angle of incidence α in respect of the Fourier plane 16.

FIG. 5 shows a detailed view of a fourth exemplary embodiment of an apparatus according to the invention. In this exemplary embodiment, the decoupling ends 55 which are arranged in an image plane 38, that corresponds to the focal plane 54, i.e. is conjugate to it, are imaged on the illumination points 3 (not illustrated in this figure) by means of an imaging optical unit 6. The illumination light bundles 5 emerging from the decoupling ends 55 of the optical fibers 13 of the optical fiber bundle 14 are collimated by means of a collimator 53 such that they intersect in the Fourier plane 16 of the focal plane 54. A phase modulator 17, which is embodied as vortex phase plate in exemplary fashion, is arranged in this Fourier plane 16. Alternatively, the phase modulator may be a device allowing the generation of three-dimensional structures including three-dimensional doughnuts as described. Namely, these three-dimensional structures have a specific distribution of intensity with a minimal intensity, ideally zero intensity. In particular, the phase modulator may generate a structure which has all three spatial directions differences in intensity. For example, the phase modulator may be spatial light modulator (SLM), said SLM allows the generation of three-dimensional as well as two-dimensional doughnuts or other structures, including a so-called bottle-beam etc.

This exemplary phase modulator 17 is also illustrated separately in FIG. 5. In general, the phase modulator 17 is distinguished in that it impresses on a light beam passing therethrough a different phase retardation depending on location. The phase modulator 17 can be embodied in such a way that a donut-shaped focus of the illumination light bundles 5 is attained in the sample 1. Such a focus has an intensity minimum, more particularly an intensity zero, on the optical axis 21. The phase modulator 17 can also have such an embodiment that a focus of the illumination light bundles 5 with a three-dimensional structure is attained in the sample 1, an intensity minimum of said focus being surrounded both laterally, for example by way of a ring-shaped intensity distribution, and axially, for example by two dome-shaped intensity distributions. Such a focus may be referred to as 3D donut.

In FIG. 8, see below, an embodiment detailing further the presence of a micromirror array 39 and a microlens array 40 in the beam path is shown. Namely, additional components of the optical imaging unit located upstream of the collimator 53 are present.

In an intermediate image plane 18, the apparatus comprises an adjustable beam deflection device 19 which comprises a first adjustable pair of mirrors 20 and a second adjustable pair of mirrors not illustrated here. The pair of mirrors 20 and the pair of mirrors not illustrated pivot the beam about mutually perpendicular axes such that the foci of the illumination light bundles 5 can be positioned in the x-direction and in the y-direction within the sample. A scanning lens 22 is disposed upstream of the adjustable beam deflection device 19 and a tube lens 23 is disposed downstream thereof. The imaging optical unit 6 contains a microscope objective 24 which focuses the illumination light bundles 5 on the illumination points 3 of the illumination point pattern 2 within the sample 1.

The illumination light bundles 5 emanating from the optical fiber bundle 14 can be generated by splitting the light 8 of a single primary light source 7, as illustrated in FIG. 2, for example. It is also possible that the illumination light bundles 5 originate from individual light sources 4 which are all embodied as primary light sources 7, as is illustrated in FIG. 1, for example.

Alternatively, it is also possible for the individual light sources 4 to be formed by spatially splitting the light 8 of a primary light source 7 into the illumination light bundles 5, the spatial splitting being realized by coupling different light components of the light 8 of the primary light source 7 into the optical fibers 13. To this end, the input end of the optical fiber bundle 14 can be, for example, illuminated over a large area by the light 8 of the primary light source 7 such that, ultimately, the decoupling ends 55 of the optical fibers 13 act as the individual light sources 4. Alternatively, provision can be made in view of a particularly good input coupling efficiency for different light components of the light 8 of the primary light source 7 to be focused into the individual optical fibers 13 of the optical fiber bundle 14 in targeted fashion. By way of example, a microlens array adapted to the spatial conditions of the optical fiber bundle 14 can advantageously be used to this end. By way of example, it is also possible to couple each light component into respectively one of the optical fibers 13 using a separate optical unit.

FIG. 6 shows an exemplary embodiment in relation to a possible arrangement of the optical fibers 13 within an optical fiber bundle 14. The spatial arrangement of the decoupling ends 55 of the optical fibers 13 defines the relative spatial arrangement of the illumination points 3, indicated in the lower part of the figure by + signs, apart from scaling by the respective imaging scale. The decoupling ends 55 of four optical fibers 13, which act as four individual light sources 4, are arranged relative to one another in a y-shaped pattern, with the optical fiber bundle 14 also containing empty positions 25.

A first optical fiber 26 of the optical fibers 13 is assigned to a first illumination point 27 within the sample. A second optical fiber 28 of the optical fibers 13 is assigned to a second illumination point 29 within the sample. A third optical fiber 44 of the optical fibers 13 is assigned to a third illumination point 30 within the sample 1. A fourth optical fiber 31 of the optical fibers 13 is assigned to a fourth illumination point 32 within the sample.

The illumination light bundles 5 emerging from the optical fibers 13 are input coupled into the optical fibers 13 in pulsed fashion such that initially a light pulse emerges from the first optical fiber 26 such that the first illumination point 27 is illuminated with the first focus 33, which is configured as a donut-shaped focus. Subsequently, a light pulse emerges from the second optical fiber 28 such that the second illumination point 29 is illuminated with a corresponding donut-shaped second focus 34. Thereafter, a light pulse emerges from the third optical fiber 44 such that the third illumination point 30 is illuminated with a corresponding donut-shaped third focus 35. Finally, a light pulse emerges from the fourth optical fiber 31 such that the fourth illumination point 32 is illuminated with a donut-shaped fourth focus 36. Subsequently, the sequence is repeated again starting with the illumination of the first illumination point 27.

FIG. 7 shows a detailed illustration of a fifth exemplary embodiment of an apparatus according to the invention. In this exemplary embodiment, the pulsed light 8 of a primary light source 7, which may be embodied as a pulsed laser, for example, is split spatially into individual illumination light bundles 5 by means of a plurality of beam splitters 9. The illumination light bundles 5 are each coupled into an optical fiber 13 by means of an input coupling optical unit 37. The optical fibers 13 are embodied with different lengths such that the individual light pulses of the illumination light bundles 5 emerge temporally in succession from the exit end 15 of the optical fiber bundle 14 formed by combining the optical fibers 13. This facilitates a sequential and repeated illumination of the illumination points 3 of an illumination point pattern 2 within a sample 1, in each case with the illumination light of an individual light source 4.

FIG. 8 shows a cut-out of right side of the beam path shown in FIG. 3. Namely, a multitude of illumination light bundles 42 emanating from the light 8 of the primary light source 7 are reflected by a micromirror array 39 reflecting the single illumination light bundle 42. Before being reflected at the micromirror array the multitude of illumination light bundles 42 can form a contiguous collimated light beam. Depending on the position of each of the mirrors, deflection of the light bundle occurs. As shown, three possible positions of the mirror, either the single mirror or as a group of mirrors, is possible, see dashed positions on the left and right of the mirror and the middle position. Depending on the position of the mirror, reflection occurs. If required, an absorber 41 is present absorbing deflected light not entering the microlens system 40. In a predetermined position of the mirror, the illuminating light bundles 5 representing the illumination point pattern (2) are directed into the lens system of a microarray of lenses, focusing each of the illuminating light bundles 42 into an image plane 38, each focus forming a illumination light point source, the illumination light bundles entering the collimator 53 for collimation in such a way that they intersect in an Fourier plane 16 with regard to the focal plane in the sample. Each of the mirrors of the micromirror array 39 may be controlled individually or as a group. In addition, the microlens array may contain lenses having the same focal length or having a different focal length. The micromirror array 39 is controlled in way, that at a given time point illumination light is reflected only to one single microlens and that the illumination points of the illumination point pattern (2) are illuminated sequentially.

FIG. 9 shows a detailed view of a sixth exemplary embodiment of an apparatus according to the invention. In this exemplary embodiment, the illumination light bundles 5 of the individual light sources 4 are coupled into the optical fibers 13 of an optical fiber bundle 14. The illumination light bundles 5 emerging from the optical fibers 13 are collimated by means of a collimator 53 and subsequently arrive at a zoom optical unit 47, the latter allowing the imaging scale, and hence the distance of the illuminated illumination points 3 relative from one another, to be adjusted. The zoom optical unit 47 contains a first lens 48, downstream of which there is an adjustable lens 49. Moreover, the zoom optical unit 47 contains a second lens 50 and a third lens 51. A phase modulator 17 for shaping the foci of the illumination light beams 5 is arranged between the adjustable lens 49 and the second lens 50. The zoom optical unit 47 is positioned immediately in front of an intermediate image plane 52. The illumination light bundles 5 emanating from the zoom optical unit 47 are focused on the illumination points 3 of the illumination point pattern 2 by means of a microscope objective 24 (not illustrated).

When localizing a fluorescence marker, it is possible, for example, to proceed in such a way that, initially, use is made of an illumination point pattern 2 in which the spacings of adjacent illumination points 3 are comparatively large. The illumination point pattern 2 is preferably chosen to be so large that a fluorescence marker to be localized is situated with certainty within the illumination point pattern 2. Here, the size of the illumination point pattern 2 to be chosen depends on the quality of the prior knowledge about the position of the fluorescence marker to be localized. Following a first localization iteration, in which illumination points 3 of the illumination point pattern 2 were each illuminated in time offset fashion by the focus of the illumination light of the illumination light bundle 5 of the individual light source 4 assigned thereto, there can be further localization iterations in an iteration process, said further localization iterations each being carried out with an illumination pattern 2 that has shorter distances between the illumination points 3 than the respective immediately preceding illumination pattern 2, wherein care is taken in each case (for example by a relative shift between the sample and illumination optical unit) for the fluorescence marker to be situated within the illumination pattern 2. This increases the accuracy of the localization from localization iteration to localization iteration.

A reduction in the distances between the illumination points 3 can be attained (both laterally and axially in view of three-dimensional illumination patterns 2) by means of the zoom optical unit 47. The zoom optical unit 47 can advantageously be embodied in such a way that the reduction in the axial distances of the illumination points 3 in a three-dimensional illumination pattern 2 is accompanied approximately quadratically with the reduction of the lateral distances.

An alternative embodiment of a device suitable for adjusting the size of the illumination point pattern 2 is shown in FIG. 11.

FIG. 10 shows a detailed view of a seventh exemplary embodiment of an apparatus according to the invention for punctiform illumination of a sample 1.

In this exemplary embodiment, the decoupling ends 55 of the optical fibers 13 of an optical fiber bundle 14 act as individual light sources 4. The illumination light bundles 5 (not illustrated in this figure) emerging from the decoupling ends 55 of the optical fibers 13 are imaged onto the illumination points 3 (not illustrated in this figure) of a three-dimensional illumination pattern 2 (not illustrated in this figure).

In the axial direction, the decoupling ends 55 of the optical fibers 13 are not all situated in the same plane. This takes account of the fact that the illumination points 3 of the three-dimensional illumination point pattern 2 are spaced apart not only laterally (xy-plane) but also in the direction of the optical axis 21 (z-direction). Some of the decoupling ends 55 of the optical fibers 13 protrude further forward in the axial direction than other decoupling ends 55, leading to the foci of the illumination light bundles 5 being arranged in different focal planes within the sample in order to be able to illuminate the illumination points 3 of the three-dimensional illumination pattern 5.

In this exemplary embodiment, there are three first decoupling ends 57 which end in a common axial plane and which are arranged at the corners of a first equilateral triangle. Moreover, there is a second decoupling end 58 centrally in the center of the optical fiber bundle 14 and it protrudes slightly further forward in the axial direction than the first decoupling ends 57. Moreover, there are three third decoupling ends 59 which end in a further common axial plane, which are likewise arranged at the corners of a second equilateral triangle and which protrude slightly further forward in the axial direction than the second decoupling end 58. The first equilateral triangle is rotated through 60 degrees in relation to the second equilateral triangle. In this way, it is possible to generate an illumination pattern 2 in which the illumination light bundles emanating from the first decoupling ends 57 and the third decoupling ends 59 illuminate the corners of an octahedron while the illumination light bundle emerging from the second decoupling end 58 illuminates the illumination point 3 located at the center of the octahedron.

Other illumination patterns are realizable by changing the number of optical fibers 13 in the optical fiber bundle 14 and/or by changing the arrangement of the decoupling ends 55 of the optical fiber bundles 14. By way of example, the illumination at the corners of a tetrahedron is possible, in particular to accurately localize a fluorescence marker in the interior of the tetrahedron. Very generally, it is largely possible to have any desired illumination pattern 2, in particular even those that have one or more illumination points 3 in the interior, in particular at the center, of a three-dimensional geometric figure.

FIG. 11 shows a further advantageous arrangement of decoupling ends 55 of the optical fibers 13 in an optical fiber bundle 14. The decoupling ends 55 are arranged at a center and on concentric rings around the center. Firstly, this arrangement allows the generation of more complex illumination point patterns 2, the illumination points 3 of which are illuminated in sequence, and secondly it however also facilitates a repetition of the sequential illumination of illumination points 3 while maintaining the shape of the illumination point pattern 2 but changing the size of the illumination point pattern 2. Such an arrangement can be used as the only device with which the spacing of the illumination points of an illumination point pattern from one another can be set or it can be used in addition to a further device with the aforementioned function, such as a zoom optical unit 47, for example.

The description in the description of the figures was provided in view of the MINFLUX method in particular. However, the arrangements shown develop corresponding advantages even if other methods are applied, for example the small field scanning method or methods combining MINFLUX triangulation and STED techniques, and are suitable for these. By way of example, in such methods it is possible to use one or more of the decoupling ends 55 for the illumination with excitation light while other decoupling ends 55 are used for sequential illumination with fluorescence prevention light, which then acts as illumination light.

LIST OF REFERENCE SIGNS

1 Sample
2 Illumination point pattern
3 Illumination points
4 Individual light source
5 Illumination light beam
6 Imaging optical unit
7 Primary light source
8 Light
9 Beam splitter
10 SLM (spatial light modulator)
11 Light intensity modulator
12 Input coupling optical unit
13 Optical fiber
14 Optical fiber bundle
15 Exit end of the optical fiber bundle 14
16 Fourier plane
17 Phase modulator
18 Intermediate image plane
19 Beam deflection device
20 Adjustable pair of mirrors
21 Optical axis
22 Scanning lens
23 Tube lens
24 Microscope objective
25 Empty position
26 Optical fiber
27 First illumination point
28 Second optical fiber
29 Second illumination point
30 Third illumination point
31 Fourth optical fiber
32 Fourth illumination point
33 First focus
34 Second focus
35 Third focus
36 Fourth focus
37 Input coupling optical unit
38 Image plane
39 Micromirror array
40 Microlens array
41 Absorber
42 illumination light bundle
47 Zoom optical unit
48 First lens
49 Adjustable lens
50 Second lens
51 Third lens
52 Intermediate image plane
53 Collimator
54 Focal plane
55 Decoupling ends of the optical fibers 13
56 Detection optical fiber bundle
57 First decoupling end
58 Second decoupling end
59 Third decoupling end

The invention claimed is:

1. An apparatus for punctiform illumination of a sample in a MINFLUX microscope, wherein an illumination point pattern is predefinable, wherein the sample being sequentially illuminated at the illumination points of the illumination point pattern, wherein a lateral extent of the illumination point pattern is smaller than a longest wavelength of illumination light, and wherein a distinct individual light source of a plurality light sources is assigned to each illumination point of the illumination point pattern, wherein each individual light source emits an illumination light bundle which is focused on the illumination point assigned thereto;

wherein an imaging optical unit is present, the imaging optical unit imaging the illumination light bundles into the illumination points and wherein the distance of an illumination point from each of its directly adjacent illumination points is less than λ/NA in each case, where λ is the longest wavelength of the illumination light bundle and NA is the numerical aperture of the imaging optical unit.

2. The apparatus as claimed in claim 1 having a control apparatus which controls the illumination process in such a way that the individual illumination points of the illumination point pattern are always exclusively illuminated with a time offset.

3. The apparatus as claimed in claim 2, wherein the lateral extend of the illumination pattern is smaller than half the longest wavelength of the illumination light.

4. The apparatus as claimed in claim 2, wherein the illumination light bundle focused on the illumination point has an intensity minimum.

5. The apparatus as claimed in claim 2, wherein the focus on the illumination point of the illumination light bundle is in a form of a 3D-Doughnut and/or
the focus of the illumination light bundle has a three-dimensional structure with a central intensity minimum, which is both a lateral and an axial intensity minimum.

6. The apparatus as claimed in claim 2, further comprising a phase modulator.

7. The apparatus as claimed in claim 2 further comprising a zoom optical unit.

8. The apparatus as claimed in claim 1, wherein the lateral extent of the illumination point pattern is smaller than half the longest wavelength of the illumination light.

9. The apparatus as claimed in claim 8, further comprising a phase modulator.

10. The apparatus as claimed in claim 8 further comprising a zoom optical unit.

11. The apparatus as claimed in claim 1, further comprising a phase modulator.

12. The apparatus as claimed in claim 1, wherein the illumination light bundle focused on the illumination point has an intensity minimum.

13. The apparatus as claimed in claim 12, further comprising a phase modulator.

14. The apparatus as claimed in claim 12 further comprising a zoom optical unit.

15. The apparatus as claimed in claim 1, wherein the focus on the illumination point of the illumination light bundle is in a form of a 3D-Doughnut and/or
the focus of the illumination light bundles has a three-dimensional structure with a central intensity minimum, which is both a lateral and an axial intensity minimum.

16. The apparatus as claimed in claim 15, further comprising a phase modulator.

17. The apparatus as claimed in claim 15 further comprising a zoom optical unit.

18. The apparatus as claimed in claim 1, wherein each illumination light bundle is guided by an optical fiber and/or in that each different illumination light bundle is always guided by different optical fibers and each illumination light bundle is assigned to a specific fiber.

19. The apparatus as claimed in claim 18, wherein
i) the optical fibers are combined to form an optical fiber bundle, or in that
ii) the optical fibers are combined to form an optical fiber bundle and are arranged relative to one another in a Cartesian or hexagonal grid.

20. The apparatus as claimed in claim 19, wherein an imaging optical unit is present, the latter imaging decoupling ends of the optical fibers into the illumination points.

21. The apparatus as claimed in claim 20 further comprising a phase modulator.

22. The apparatus as claimed in claim 21, wherein the primary light source emits pulse light.

23. The apparatus as claimed in claim 20, wherein the primary light source emits pulse light.

24. The apparatus as claimed in claim 19 further comprising a zoom optical unit.

25. The apparatus as claimed in claim 18, wherein the optical fibers are embodied as single mode fibers and/or as polarization-maintaining fibers.

26. The apparatus as claimed in claim 25, wherein an imaging optical unit is present, the latter imaging the decoupling ends of the optical fibers into the illumination points.

27. The apparatus as claimed in claim 26 further comprising a phase modulator.

28. The apparatus as claimed in claim 27, wherein the primary light source emits pulse light.

29. The apparatus as claimed in claim 26, wherein the primary light source emits pulse light.

30. The apparatus as claimed in claim 25 further comprising a zoom optical unit.

31. The apparatus as claimed in claim 18, wherein an imaging optical unit is present, the imaging optical unit imaging the decoupling ends of the optical fibers into the illumination points.

32. The apparatus as claimed in claim 31 further comprising a phase modulator.

33. The apparatus as claimed in claim 32, wherein the primary light source emits pulse light.

34. The apparatus as claimed in claim 31, wherein the primary light source emits pulse light.

35. The apparatus as claimed in claim 31 further comprising a zoom optical unit.

36. The apparatus as claimed in claim 31, wherein the individual light source are formed by spatially splitting the light of a primary light source into the illumination light bundle and wherein the primary light source emits pulse light.

37. The apparatus as claimed in claim 18 further comprising a zoom optical unit.

38. The apparatus as claimed in claim 1, wherein the individual light sources are formed by spatially splitting the light of a primary light source into the illumination light bundles.

39. The apparatus as claimed in claim 38, wherein the primary light source emits pulsed light.

40. The apparatus as claimed in claim 38, wherein the spatial split is realized by coupling different light components of the illumination light of the primary light source into different optical fibers.

41. The apparatus as claimed in claim 1 further comprising a zoom optical unit.

* * * * *

UNITED STATES PATENT AND TRADEMARK OFFICE
CERTIFICATE OF CORRECTION

| | | |
|---|---|---|
| PATENT NO. | : 12,352,943 B2 | Page 1 of 1 |
| APPLICATION NO. | : 17/462362 | |
| DATED | : July 8, 2025 | |
| INVENTOR(S) | : Benjamin Harke and Lars Kastrup | |

It is certified that error appears in the above-identified patent and that said Letters Patent is hereby corrected as shown below:

On the Title Page

Please add foreign priority to Luxembourgian patent application LU101084, with a filing date of 12/21/2018

Signed and Sealed this
Fifth Day of August, 2025

Coke Morgan Stewart
*Acting Director of the United States Patent and Trademark Office*